H. EMRICH.
SCRATCHER OR SCRAPER FOR STIRRING APPARATUS IN SULFATE FURNACES.
APPLICATION FILED AUG. 22, 1913.
1,121,004. Patented Dec. 15, 1914.
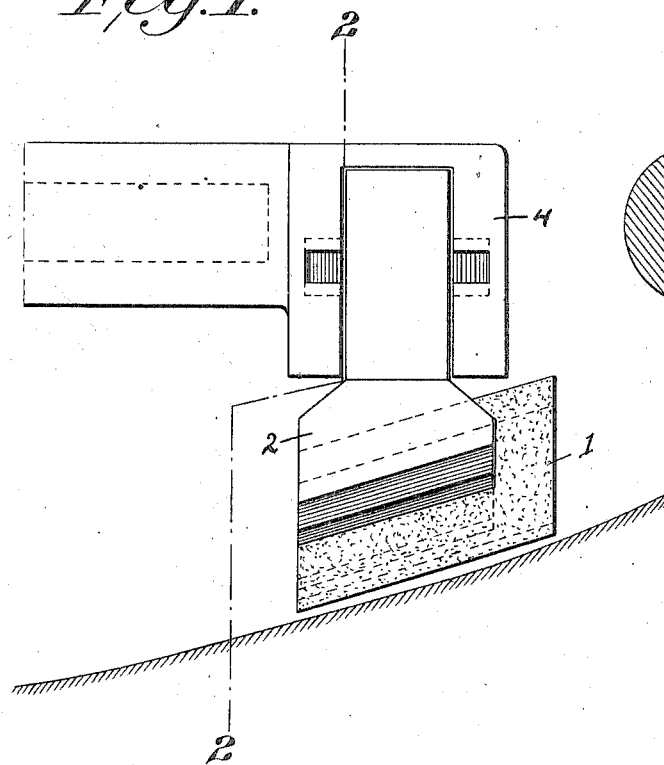
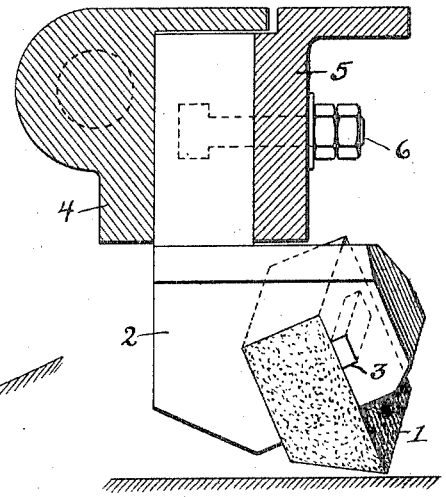
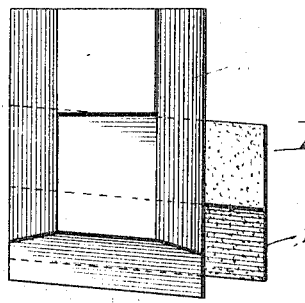

UNITED STATES PATENT OFFICE.

HEINRICH EMRICH, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

SCRATCHER OR SCRAPER FOR STIRRING APPARATUS IN SULFATE-FURNACES.

1,121,004.   Specification of Letters Patent.   Patented Dec. 15, 1914.

Application filed August 22, 1913. Serial No. 786,204.

*To all whom it may concern:*

Be it known that I, HEINRICH EMRICH, engineer, a citizen of the Empire of Germany, residing at Höchst-on-the-Main, Germany, have invented certain new and useful Improvements in Scratchers or Scrapers for Stirring Apparatus in Sulfate-Furnaces, of which the following is a specification.

In the chemical industry the resisting power of the plant is of great importance in regard to the economy of the technical processes. Thus, in the manufacture of acids a great part of the expenses is caused by the considerable wearing out of the implements of the furnaces, the stirrers, scratchers and the like. Moreover, the efficiency of the furnaces that have been hitherto employed in the manufacture of sulfate has been dependent on the resisting power of the parts of the plant mostly attacked by the acids and the high temperature, namely the scratchers. The metallic scrapers are particularly quickly worn out in the calcination stage, in consequence of which the sulfate crust on the hearth soon accumulates to such a thickness that it fails to conduct the heat sufficiently, so that the furnace becomes unproductive and has to be put out of action for the removal of the crust and for repairs. In all text-books dealing with inorganic chemical industry there is repetition of complaints about the wear and life of the scrapers and scratchers in said furnaces. The many attempts to reduce the wear and prolong the life of such parts have been unsuccessful.

The present invention has for its object to remedy these drawbacks by using an acid-resisting and fireproof stone substance for making the scratchers or scrapers employed in the working or stirring of the mass during the reaction. For this purpose all stoneware materials having the particular properties of being hard-burnt, fireproof and acid-resisting may be used. The acid-resisting power possessed by certain kinds of stone is generally known, but the idea of utilizing this property in the making of the parts referred to is entirely novel, and the possibility of its use for this purpose could not be foreseen.

Apart from the fact that in no publication has any proposal been made to use any stone substance for the scratchers and scrapers, not one of the many makers has conceived the advantage of using therein scratchers made of stone material. Furthermore, the manufacturers who are already working with such furnaces for tens of years and, therefore, know their deficiencies, would certainly have availed themselves of this invention and put it into practice.

By using in sulfate furnaces, stirrers, scratchers, scrapers or the like made of fireproof and acid-resisting stone substance, the period during which such furnaces keep in good working order is greatly prolonged. This means a very considerable technical advance, because the time that would be otherwise necessary for cooling, cleansing and repairing the furnace is saved, and moreover, as every manufacturer knows, frequent interruptions in the working involve short durability of the whole plant.

In the accompanying drawing illustrating one embodiment of the invention—Figure 1 shows in elevation one end of a scraper arm in operative position; Fig. 2 is an elevation of the same, partly in section, on line 2—2 of Fig. 1; and Fig. 3 is a plan view of the scraper and frame detached from the arm.

In said drawings, the scraper 1 of acid-resisting stone, is of chisel form and is mounted in a frame 2, being secured thereto by a wedge 3. The frame 2 is connected in any suitable manner to the arm 4 of the stirring apparatus, the securing means chosen for illustration comprising a cap-plate 5 and a bolt 6. The scraper thus made of stone absolutely prevents the accumulation of a sulfate crust on the hearth of the furnace.

The word "scraper" as used in the claims is to be understood as including like elements, as stirrers, etc.

It will be observed that in this construction the stones are so mounted as to permit the direct replacement of any individual stones, without removal of others.

Having now described my invention, what I claim is:

1. In a sulfate furnace, a scraper comprising a solid, acid-resisting, fireproof, shaped stone, in combination with attaching means therefor, said attaching means constructed to permit the direct replacement of the stone.

2. In a sulfate furnace, a scraper comprising a plurality of solid, acid-resisting, fireproof, shaped stones, in combination with attaching means therefor, said attaching means constructed to permit the direct replacement of the individual stones.

In testimony whereof I affix my signature in presence of two witnesses.

HEINRICH EMRICH.

Witnesses:
WILLIAM DAWSON, Jr.,
CARL GRUND.